United States Patent [19]

Pastor et al.

[11] 4,052,742
[45] Oct. 4, 1977

[54] MAGNETIC TAPE RECORDER DRIVE MECHANISM HAVING A LATCHING MEMBER WITH A PAUSE MODE AND A STOP MODE

[75] Inventors: Sheldon Lee Pastor, St. Paul; Milton E. Erickson, North St. Paul, both of Minn.; Donald D. Kahn, Camarillo, Calif.

[73] Assignee: Minnesota Mining & Manufacturing Company, St. Paul, Minn.

[21] Appl. No.: 636,320

[22] Filed: Nov. 28, 1975

[51] Int. Cl.² .................. G11B 15/26; G11B 15/24; G11B 15/10; G11B 5/54
[52] U.S. Cl. ........................ 360/96; 360/74; 360/105
[58] Field of Search ............ 360/96, 92, 105, 93, 360/90, 71, 74, 6; 179/100.1 VC; 242/192, 210, 202; 226/50

[56] References Cited

U.S. PATENT DOCUMENTS

| | | | |
|---|---|---|---|
| 3,653,669 | 4/1972 | Sterly | 360/92 |
| 3,659,859 | 5/1972 | Marcinkus | 360/92 |
| 3,661,396 | 5/1972 | Sterly | 360/92 |
| 3,838,459 | 9/1974 | Bettini et al. | 360/96 |
| 3,865,986 | 2/1975 | Darwood | 179/100.1 VC |
| 3,918,093 | 11/1975 | Seale-Finch | 360/105 |
| 3,959,822 | 5/1976 | Platt | 360/96 |

*Primary Examiner* — Alfred H. Eddleman
*Attorney, Agent, or Firm* — Cruzan Alexander; Donald M. Sell; William B. Barte

[57] ABSTRACT

A driving mechanism for a magnetic tape recorder especially adapted for use with preloaded cassettes includes a carriage having a magnetic recording/playback head and a pressure roller mounted thereon. A latching member mechanically holds the carriage such that the roller and recording/playback head is in either a stop mode position, a pause mode position or a run mode position. In the stop mode position, the recording/playback head and the roller is fully retracted from the cassette to allow replacement of cassettes. In the pause mode position, the recording/playback head is adjacent to the tape to allow retrieval of information recorded thereon and the pressure roller is slightly withdrawn from the capstan such that a slight movement of the carriage causes the roller to quickly move to the run mode position to provide fast starting capability. In the run mode position, the recording/playback head is fully contacted against the tape and the pressure roller is in contact with a capstan.

11 Claims, 4 Drawing Figures

MAGNETIC TAPE RECORDER DRIVE MECHANISM HAVING A LATCHING MEMBER WITH A PAUSE MODE AND A STOP MODE

BACKGROUND OF THE INVENTION

1. Field of the Invention

This invention relates to magnetic tape recorder drive mechanisms.

2. Description of the Prior Art

Magnetic tape recorders suitable for voice logging use are often voice activated to save tape and to reduce the frequency with which tapes must be changed. A major problem of such voice activated recorders has been the inability to capture the first portion of a message due to the time required to bring the tape to full operating speed. Such a portion may contain vital information such as the first digit of a number or the name of a person to whom the conversation is being directed. In the so called "Watergate tapes", important information was often lost before the recorder became fully operative.

Typically, voice activated logging recorders employ electrical solenoids to switch from standby into run position. Approximately 100 milliseconds may be required. While it might be possible to reduce the switching time by employing larger solenoids or by driving the solenoids with larger current pulses, this would be tend to increase the expense and size of the recorders.

SUMMARY OF THE INVENTION

The driving mechanism of the present invention provides a rapid start-up capability, typically attaining full operability in 5 to 10 milliseconds, making it especially suitable for voice-actuated voice logging recorders. This highly desirable rapid start-up is attained by a driving mechanism including a frame and a tape transport assembly mounted on the frame in which a pressure roller is mechanically biased toward a driven capstan. The pressure roller is movable between a run mode position and a pause mode position at which the roller is slightly withdrawn from the capstan. A latching mechanism is provided for mechanically holding the roller in the pause mode position against the mechanical bias together with a trigger including a solenoid for releasing the latching mechanism to allow the roller to spring into the run mode position.

A preferred embodiment includes a carriage similar to that disclosed in U.S. Pat. No. 3,542,312 (Erickson) on which the pressure roller is mounted, together with the erase and record/playback heads. The pressure roller is held by the latching mechanism in the pause mode position at which the pressure roller is only slightly withdrawn from the capstan and need be moved only a small distance to contact the capstan. By keeping the capstan running, recording is initiated the instant the pressure roller contacts the capstan. To facilitate threading the tape in a reel-to-reel recorder or insertion and removal of the magazine containing the tape, the pressure roller should be movable to a stop mode position at which it is appreciably spaced from the capstan, preferably by withdrawing the carriage as in the Erickson patent.

DESCRIPTION OF THE PREFERRED EMBODIMENTS

Figure 1:
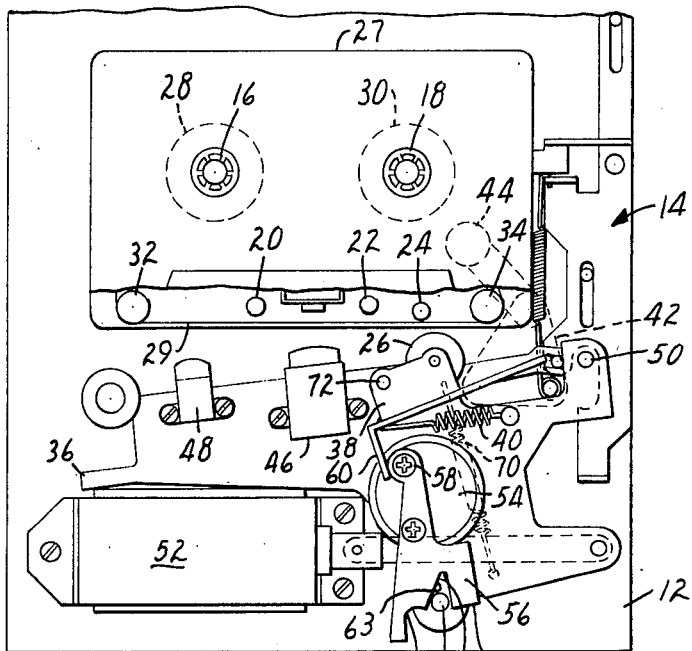
FIG. 1 is a partial cut-away top view of one embodiment of a magnetic tape recorder driving mechanism according to the present invention, shown in a stop mode position.
Figure 2:
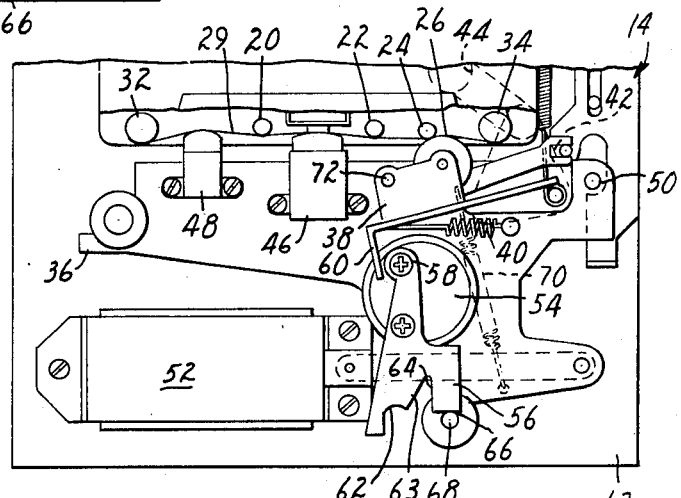
FIG. 2 is a partially cut-away top view of the driving mechanism shown in FIG. 1 in which the mechanism is in a run mode position.
Figure 3:
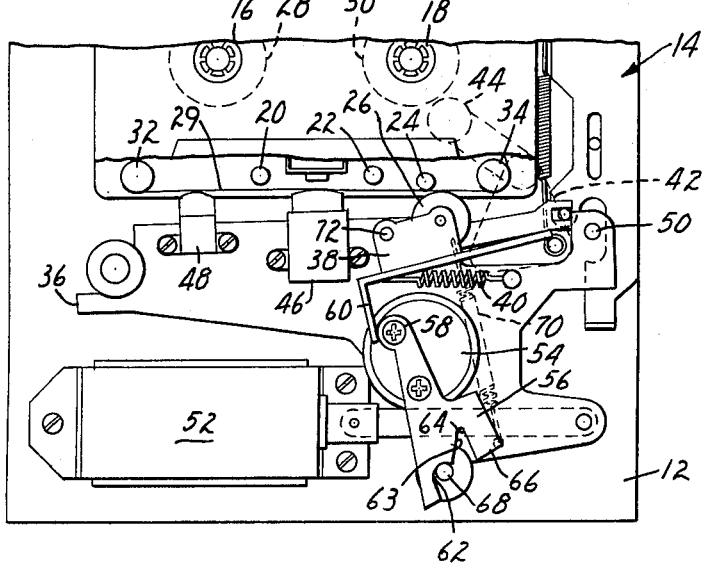
FIG. 3 is a partially cut-away top view of the driving mechanism shown in FIGS. 1 and 2 in which the mechanism is in a pause mode position.

In the preferred embodiment of the present invention as depicted in FIGS. 1–3, a driving mechanism similar to that set forth in U.S. Pat. No. 3,542,312 is provided. The mechanism includes a frame 12 and a tape transport assembly shown generally as 14 mounted on the frame 12. The assembly 14 includes spindles 16 and 18 for supporting a supply hub and a take-up hub, positioning pins 20 and 22, a capstan 24 and a pressure roller 26. The assembly is adapted to receive a preloaded magazine such as a standard cassette 27 containing a magnetic recording tape 29 on supply and take-up hubs 28 and 30, respectively, which tape extends along a tape transport path at one side of the cassette from the supply hubs 28, around guide 32, adjacent the positioning pins 20 and 22, between the capstan 24 and pressure roller 26, around the guide 34 and thence onto the take-up hub 30. The assembly further provides means (not shown) for driving the spindles 16 and 18 and capstan 24 in a conventional manner as described in U.S. Pat. No. 3,542,312. The driving mechanism preferably includes a movable carriage 36 movably mounted on the frame 12 on a pivot 50. The pressure roller 26 and a support member 38 therefor is, in turn, movably mounted on the carriage 36 on pivot 72, and is biased by spring 40 such that when released, the pressure roller is moved toward the capstan 24. Also mounted on the carriage 36 is a record/playback head 46 and an erase head 48. Linking members 42 and 44 are activated by the carriage 36 when in the stop or pause mode positions to disengage the drive to the take-up spindle 18. A linear solenoid 52 is coupled to the carriage and when energized causes the carriage 36 to be pivoted clockwise toward the capstan 24 to a forward position at which the roller is in the pause mode position or in the run mode position. In such positions, the heads 46 and 48 and pressure roller 26 are within the opening in the edge of the cassette 27, with the heads in contact with the tape therein. A rotary solenoid 54 is also mounted on the carriage 36. Attached to the rotor plate of the rotary solenoid 54 is an arm 56. This arm includes a cam 58 on one end which bears against an extension 60 of the pressure roller support 38 so as to oppose the mechanical bias provided by spring 40 and withdrew the pressure roller 26 from the capstan 24. The other end of the arm 56 is shaped to provide three detents 62, 64 and 66, which detents when in respective engagement with a stop member 68 maintain the carriage to provide the off, pause or run mode positions. The carriage 36 is biased away from the capstan by means of spring 70 to thus hold the roller 26 in the stop mode position. The arm 56 is normally biased in a clockwise position by the pressure of the extension 60 bearing on the surface of the cam 58. As shown in FIG. 1, in the off mode position, the arm 56 is positioned such that the detent 64 is adjacent the stop member 68. This allows the carriage 36 to move away from the cassette 27, such that the heads 46 and 48 and roller 26 are fully retracted from the opening in the cassette, thereby allowing replacement of the cassettes into the transport mechanism.

In the run mode position shown in FIG. 2, the carriage 36 is rotated clockwise about pivot 50 such that the erase and record/playback heads 48 and 46 respectively are in full contact with the magnetic tape 29. In this position, the pressure roller 26 is advanced to press the tape against the capstan 24, thereby driving the tape 29 along the tape transport path. These members are maintained in this position by the arm 56, which is shown, is rotated clockwise such that the detent 66 is resting against the stop member 68, thereby opposing the mechanical bias provided by spring 70.

In FIG. 3, the driving mechanism of the preferred embodiment of the present invention is shown in the pause mode position. In this position, the carriage 36 is partially rotated about pivot 50, such that the detent 62 of the arm 56 is in contact with the stop member 68. In this position, the record/playback head 46 is partially withdrawn but is still sufficiently close to the magnetic tape 29 to enable retrieval of recorded data during high speed advance or rewind operations. The pressure roller 26 is slightly withdrawn from the capstan 24 by the pressure of the cam 58 against the extension 60.

Figure 4:
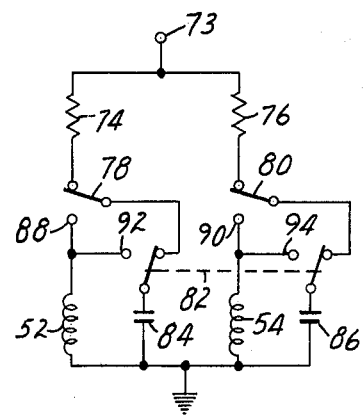
FIG. 4 is a schematic diagram of a circuit useful with the driving mechanism shown in FIGS. 1–3.

In an especially preferred embodiment, the mechanism shown in FIG. 1-3 is moved between the respective off, pause and run mode positions by intermittent energization of the solenoids 52 and 54. An exemplary circuit for so energizing the solenoids is shown in FIG. 4. In this circuit, a source of DC potential may be applied between terminal 73 and ground. This potential is coupled in parallel through resistors 74 and 76 and thence through switches 78, 80 and 82, when in the normal positions as shown, to charge the capacitors 84 and 86. The closing of the respective switches 78, 80 and 82 allows the charge stored in the capacitors 84 and 86 to be discharged through the solenoids 52 and 54 as desired.

Such a circuit may be used to switch the mechanism shown in FIGS. 1-3 between the off, pause and run mode positions in the following manner:

a. To switch from the stop mode position to the run mode position, the switch 78 is closed. This causes the capacitor 84 to discharge through contact 88 of switch 78, thereby momentarily energizing solenoid 52. This in turn causes the carriage 36 to be rotated clockwise about the pivot 50 such that the detent 66 is adjacent the stop member 68. As soon as the electrical pulse provided by the discharge of capacitor 84 terminates, the solenoid 52 releases and allows a slight counter-clockwise rotation of carriage 36 such that the detent 66 comes into contact with the stop member 68, thereby maintaining the pressure roller 26 in contact with the capstan 24 with the tape firmly pressed therebetween and with the heads 46 and 48 respectively in full contact with the tape.

b. To thereafter switch to the stop mode position, the switch 80 is closed. This causes the charge stored in capacitor 86 to discharge through contact 90 of switch 80 and thence through the solenoid 54. This momentarily activates the solenoid 54, and rotates the arm 56 counter-clockwise, causing the detent 64 to be adjacent the stop member 68 such that the carriage 36 rotates counter-clockwise about the pivot 50 into the stop mode position.

c. To switch to the pause mode position, switch 82 is closed. Switch 82 consists of a double-pole, double-throw switch and is connected such that upon closure, the charge stored in capacitor 84 discharges through contact 92 into the solenoid 52 and the charge stored in capacitor 86 discharges through contact 94 into solenoid 54. The simultaneous energization of both solenoids causes the carriage 36 to rotate clockwise about pivot 50 to the forward position and the arm 56 to be rotated counter-clockwise such that the detent 62 is adjacent the stop member 68. The time constants dictated by the electrical parameters of the solenoid 52 and its associated capacitor 84 and the solenoid 54 and its associated capacitor 86 are selected such that solenoid 54 remains energized for a short period after the solenoid 52 becomes de-energized. This ensures that the arm 56 will remain in a counter-clockwise position until after the carriage 36 has moved counter-clockwise slightly as a result of the de-energization of the solenoid 52 and thereby brings the detent 62 into contact with the stop member 68. In this position, the record/playback head 46 is in slight contact with the magnetic tape 29 and the pressure roller 26 is slightly withdrawn from the capstan 24, such that the tape is not driven by the capstan 24, as is shown in FIG. 3.

Preferably, the arm 56 is provided with a ramp 63 extending between the pause detent 62 and the stop detent 64. In such an embodiment, the energization of solenoid 54 alone rotates the arm 56 so that the ramp 63 bears against the stop member 68 and thereby forces the carriage 36 to rotate clockwise to the forward position and the arm 56 to rotate counter-clockwise such that the detent 62 is adjacent the stop member 68.

d. To switch from the pause mode shown in FIG. 3 to the run mode, shown in FIG. 2, the solenoid 52 is energized by closing switch 78. This causes the charge in capacitor 84 to discharge through solenoid 52 as discussed hereinabove and causes the carriage 36 to rotate a small amount clockwise about pivot 50 such that the arm 56, which likewise rotates clockwise due to the pressure of the extension 60 against the cam 58, bringing the detent 66 into contact with the stop member 68.

In an alternative embodiment, the arm 56 may be constructed without the detent 66. In such an embodiment, the mechanical positioning formerly provided by the detent 66 is provided by continuous energization of the solenoid 52, to maintain the carriage 36 in the forward position. Accordingly, in the operation of such an embodiment, the following steps would desirably be followed:

a. To switch to the run mode, the solenoid 52 is continuously energized, causing the carriage 36 to rotate about the pivot 50 such that the pressure roller 26 comes into contact with the capstan 24. This position will be maintained only so long as the solenoid 52 is energized.

b. To switch to the stop mode, solenoid 52 is merely de-energized, thereby allowing the detent 64 to be adjacent the stop member 68 such that the carriage 36 is allowed to rotate counter-clockwise about the pivot 50.

c. To switch to the pause mode position, both solenoids 52 and 54 are pulsed, thereby causing the carriage 36 to rotate clockwise to the run mode position while the arm 56 rotates counter-clockwise such that the detent 62 is adjacent the stop member 68. Upon cessation of the energization of both solenoids 52 and 54 as discussed hereinabove, the detent 62 rests on the stop member 68 to maintain the pressure roller spaced a slight distance away from the capstan 24.

d. To switch from the pause mode to the run mode position, solenoid 52 is again continuously energized and thereby causes the carriage 36 to rotate a small amount about pivot 50 such that the arm 56 is released, allowing the extension 60 to press against the cam 58, due to spring 40 thereby rotating the arm 56 clockwise such that the pressure roller 26 presses against the capstan 24.

It has been found that normal energization of the solenoid 52, moving the carriage 36 from the off to the run mode positions, requires approximately 100 milliseconds to actuate the driving mechanism. While such energization times are sufficient in many audio recording applications, voice logging applications require an appreciably shorter start-up time. With the embodiment of the present invention, it has been found that one can move the carriage 36 from the pause to the run mode position in approximately 5 milliseconds and thereby minimize the loss of recorded data at the beginning of input information.

Further, for voice logging applications, it is desirable to enable retrieval of indexing information directly from the tape during rapid rewind or advance operations. It has been found that if the record/playback head is maintained in full contact with the tape during such operations, the additional tension on the tape is sufficient to occasionally cause the tape to jam inside the cassette. Thus, the partial withdrawal of the head in the pause mode position is especially desirable.

While the circuit as shown in FIG. 4 for energizing the driving mechanism of the present invention has been depicted in the form of manually operable switches, it is similarly within the scope of the present invention that any variety of other logic circuits, relays and the like may be utilized to electrically and remotely switch the driving mechanism between the respective modes.

Having thus described the present invention, what is claimed is:

1. A driving mechanism of a magnetic tape recorder suitable for voice logging use comprising
    a frame,
    a tape transport assembly mounted on the frame including a driven capstan and a pressure roller mechanically biased toward the capstan and movable between a run mode position at which the roller is positioned to press the tape against the capstan, and a record/playback head is in full contact with the tape, a pause mode position at which the roller is slightly withdrawn from the capstan and the head is in contact with said tape, and a stop mode position at which the roller is appreciably withdrawn from the capstan and the head is fully retracted from the tape,
    latching means for mechanically holding the roller in either the pause mode position or the stop mode position against the mechanical bias, and
    trigger means including a solenoid for releasing the latching means to allow the roller to quickly move into the run mode position to provide fast starting capability.

2. A driving mechanism according to claim 1, adapted for use with magnetic recording tape in a preloaded magazine in which the tape extends along a path at one side of the magazine which is open to receive the pressure roller and in which the spacing between the capstan and pressure roller in the pause mode position is too small to permit the magazine to be replaced until the roller is retracted into the stop mode position.

3. A driving mechanism according to claim 1, wherein the latching means further comprises means for disengaging a drive to a tape take-up spindle when the roller is in the pause mode position.

4. A driving mechanism according to claim 1, wherein the latching means includes a driven arm having three detent positions corresponding to the said run, pause and stop mode positions and a stop member against which the arm may be positioned, and said solenoid comprises a linear solenoid which when energized moves the arm from the stop member to free the mechanical bias to force the roller into the run mode position.

5. A driving mechanism according to claim 4, wherein said trigger means further includes means for releasing the arm from the detent position corresponding to the run mode position to allow the roller to move from the run mode position.

6. A driving mechanism according to claim 5, wherein the trigger means comprises a second solenoid which when energized while the roller is in the run mode position moves the roller away from the run mode position.

7. A driving mechanism according to claim 6, wherein the latching means further comprises means for simultaneously energizing both of the solenoids, and means for deactivating the second solenoid after deactivation of the first solenoid to move the roller into the pause mode position.

8. A driving mechanism according to claim 7, further comprising
    energy storage means, means for applying energy to the storage means, and means for selectively discharging the storage means to momentarily energize first and second solenoids.

9. A driving mechanism according to claim 6, wherein the tape transport assembly further comprises a carriage mechanically biased to position the roller in the stop mode position and movable by said linear solenoid toward the capstan to a forward position at which the roller is in the pause mode position or in the run mode position, and wherein said second solenoid when energized when the carriage is in the forward position moves the roller into the pause mode position.

10. A driving mechanism according to claim 9, wherein said second solenoid comprises a rotary solenoid mounted on said carriage and wherein said latching means is driven by a rotor of said rotary solenoid.

11. A driving mechanism of a magnetic tape recorder comprising a frame supporting a tape transport assembly including a driven capstan and a pressure roller mechanically biased toward the capstan and adapted for use with magnetic recording tape in a preloaded magazine which has an enclosed opening for receiving the capstan and which is open at one side to receive the pressure roller,
    means for moving said roller between a run mode position at which the roller is mechanically biased to press the tape against the capstan and at which a record/playback head is in full contact with the tape, a pause mode position at which the roller is slightly withdrawn from the capstan and the head is in contact with the tape and a stop mode position at which the roller is extracted from the magazine and the head is fully retracted from the tape to facilitate exchange of magazines,
    latching means for mechanically holding the roller in the pause mode position against the mechanical bias, and
    trigger means including a solenoid for releasing the latching means to allow the roller to quickly move to the run mode position to provide fast starting capability.

* * * * *